F. W. WHITE & A. W. FISHER.
DOUGH RAISING APPARATUS.
APPLICATION FILED MAR. 30, 1910.
1,011,542.
Patented Dec. 12, 1911.
2 SHEETS—SHEET 2.
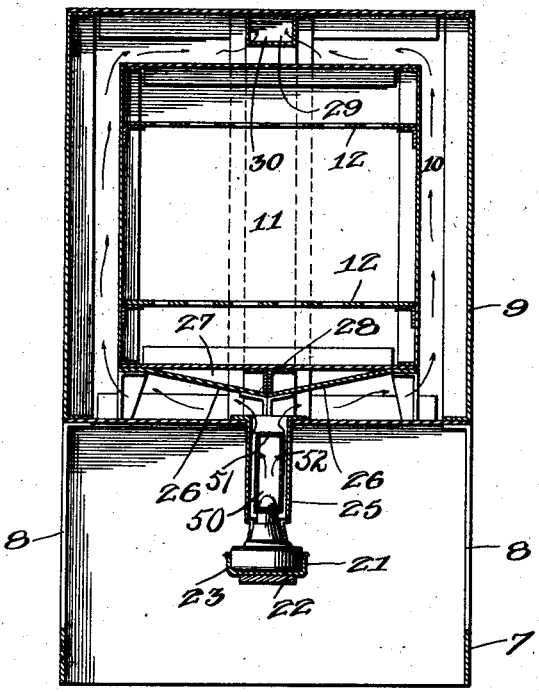
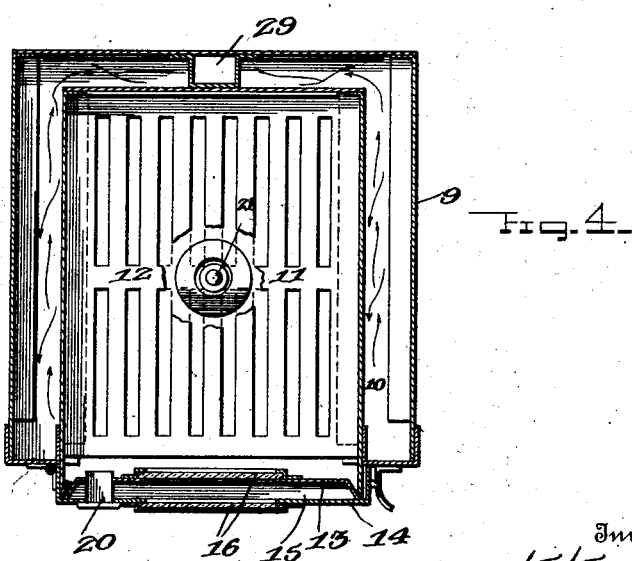

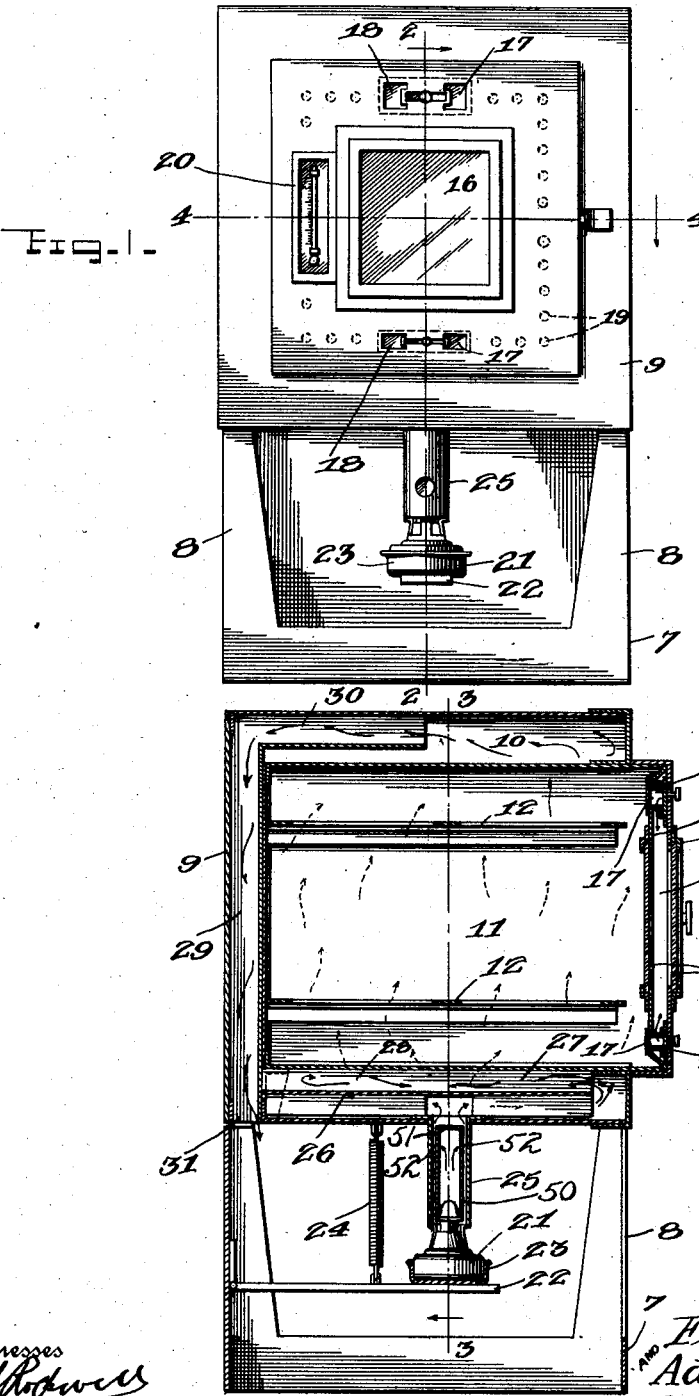

UNITED STATES PATENT OFFICE.

FRED W. WHITE AND ADA WHITE FISHER, OF WHITES VALLEY, PENNSYLVANIA.

DOUGH-RAISING APPARATUS.

1,011,542.  Specification of Letters Patent.  Patented Dec. 12, 1911.

Application filed March 30, 1910. Serial No. 552,405.

*To all whom it may concern:*

Be it known that we, FRED W. WHITE and ADA WHITE FISHER, citizens of the United States, residing at Whites Valley, in the county of Wayne and State of Pennsylvania, have invented certain new and useful Improvements in Dough-Raising Apparatus, of which the following is a specification.

The present invention relates to means for maintaining dough in warm condition, for the purpose of effecting the raising thereof, and the primary object is to provide a novel and simple structure, in which a uniform heat is supplied to the dough, and danger of overheating or burning is entirely eliminated.

Two embodiments of the invention are disclosed in the accompanying drawings, wherein:—

Figure 1 is a front elevation of the preferred form of construction. Fig. 2 is a vertical sectional view therethrough on the line 2—2 of Fig. 1. Fig. 3 is a vertical sectional view on the line 3—3 of Fig. 2. Fig. 4 is a horizontal sectional view on the line 4—4 of Fig. 1.

Similar reference numerals designate corresponding parts in all the figures of the drawings.

In the embodiment illustrated, in Figs. 1–4 inclusive, a supporting base 7 is employed having standards 8 on which is located a cubical casing 9, preferably constructed of sheet metal and forming a heat chamber 10. Arranged within this heat chamber, and spaced from the sides, top and bottom thereof, is an oven member 11, having one or more removable and perforate shelves 12. Said oven member extends through one side of the outer casing and has a door, by means of which access can be obtained to the interior of said oven member. In the embodiment disclosed, a double door is provided, comprising an inner member 13 and an outer member 14, the same being capable of independent movement and having a space 15 formed between them. The members are provided with alined windows 16, through which the contents of the oven member can be viewed, and they are furthermore provided with lower and upper ventilating openings 17, which can be controlled by suitable slides 18. The space 15 is preferably in communication with the oven 11 through openings 19 formed in the inner door element 13. A thermometer 20 may also be employed in order that the temperature of the interior of the oven member can be easily ascertained.

A source of heat, shown in the form of a lamp 21, is located in the base below the outer casing or heat chamber, and may be supported in any suitable manner. Thus in the present embodiment, a hinged arm 22 is illustrated having on its free end a cup 23 that receives the heater, said arm being yieldingly supported by a spring 24. A flue 25 depending from the casing, receives the burner of the heater, and said flue has its upper end communicating centrally with the bottom of the heat chamber 10. Interposed between the upper end of this flue and the bottom of the oven member, is a deflector, the same comprising angularly disposed walls 26, the central ridge or apex of which is disposed centrally over the flue. The outer margins of these walls are secured, as shown in Fig. 3, to the bottom of the oven member and the space between the deflector and the bottom of said oven member, designated 27, communicates with the interior of the casing or heat chamber at the opposite edges of the deflector to those secured to the oven. A reinforcing strip 28 may be interposed between the apex of the deflector and the bottom of the oven member.

For the purpose of carrying off the heated air and products of combustion from the heat chamber, a flue 29 is employed that preferably extends vertically in the rear portion of the heat chamber, and has a horizontal inlet end 30 opening into the upper portion of said heat chamber. The outlet end 31 of this outlet flue is located below the inlet end and opens exteriorly of the heat chamber.

With this construction, it will be obvious that the air and heated products of combustion, which pass upwardly through the flue 25, will strike the deflector, and thus move outwardly in opposite directions, and upwardly on opposite sides of the oven member, as indicated by the arrows in Fig. 3. From the top of the heat chamber, said products of combustion will enter the flue 29, and as they cool, will pass readily downwardly and out of the heat chamber. With this construction, therefore, an even temperature may be secured, and the bottom of the oven member is protected from overheating and burning by the deflector, the space between the said deflector and the bottom being open to permit the free circulation of air.

A detail of practical importance which is preferably utilized in carrying forward the invention is to arrange within the main burner flue 25 a supplemental shielding flue 50 having a closed top portion 51, and near the latter provided with outlet openings 52 through which the heated products escape from the interior of the shielding flue 50 into the main outer flue 25. The said shielding flue 50 is fitted at its lower end directly over the burner of the lamp 21 and is of a less diameter than the main flue 25. This construction and arrangement of parts provides means for further preventing the too direct entry of the heat into the main circulating spaces and passages about the oven, while at the same time preventing the flame of the lamp from being blown out by the jarring in closing the door.

In connection with the operation of the invention it will be observed that by reason of the flue 29 having its inlet in the center of the upper part of the heat chamber, and its outlet at the bottom of the heat chamber, the said heat chamber must be filled with warm air before any warm air can commence to escape. This insures a thorough and uniform heating of the oven. Again, it will be observed that by reason of having the ventilating openings 17 in connection with the outer air and the space between the doors 15, and the latter in communication with the interior of the oven through the openings 19, an even and thorough ventilation is secured.

From the foregoing, it is thought that the construction, operation and many advantages of the herein described invention will be apparent to those skilled in the art without further description, and it will be understood that various changes in the size, shape, proportion and minor details of construction, may be resorted to without departing from the spirit or sacrificing any of the advantages of the invention. In this connection, it is to be understood that the apparatus described herein, while of special utility as a dough raising cabinet is also capable of application to other uses, such for instance as an evaporator or drier for drying fruits or vegetables and also as a warming closet, as will be well understood by those familiar with this class of apparatus.

Having thus fully described our invention, what we claim as new, and desire to secure by Letters Patent, is:—

In a device of the character described, the combination of a casing inclosing a heat chamber, an oven arranged within the casing and spaced therefrom, means for causing heat to enter the bottom of the casing, a deflector applied to the bottom of the oven and comprising oppositely inclined walls which meet in a ridge, a reinforcing rib between the oven and the said ridge, and a flue for producing a circulation of air through the heat chamber.

In testimony whereof we hereunto affix our signatures in the presence of two witnesses.

FRED W. WHITE.
ADA WHITE FISHER.

Witnesses:
O. D. DICKINSON,
JOHN D. ALLEN.

---

Copies of this patent may be obtained for five cents each, by addressing the "Commissioner of Patents, Washington, D. C."